Oct. 8, 1940.  G. A. SPENCER  2,217,500

TURBINE DIAPHRAGM ARRANGEMENT

Filed April 15, 1939

Inventor:
George A. Spencer,
by Harry E. Dunham
His Attorney.

Patented Oct. 8, 1940

2,217,500

UNITED STATES PATENT OFFICE 2,217,500

TURBINE DIAPHRAGM ARRANGEMENT

George A. Spencer, Lynn, Mass., assignor to General Electric Company, a corporation of New York Application April 15, 1939, Serial No. 268,031

1 Claim. (Cl. 253—78)

The present invention relates to turbine diaphragm arrangements for conducting elastic fluid from one turbine bucket wheel to another bucket wheel and comprising a diaphragm and a sealing device for sealing such diaphragm to a turbine shaft. In such arrangements the diaphragm is usually made of two halves and means are provided for positioning the two halves with respect to each other and also for preventing or limiting rotary movement of the sealing device relative to the diaphragm.

The object of my invention is to provide an improved construction and arrangement of the type specified above whereby the means for holding two diaphragm halves and a sealing device in their relative positions is simplified and may be manufactured at relatively low cost.

For a consideration of what I believe to be novel and my invention, attention is directed to the following description and the claim appended thereto in connection with the accompanying drawing.

Figure 1:
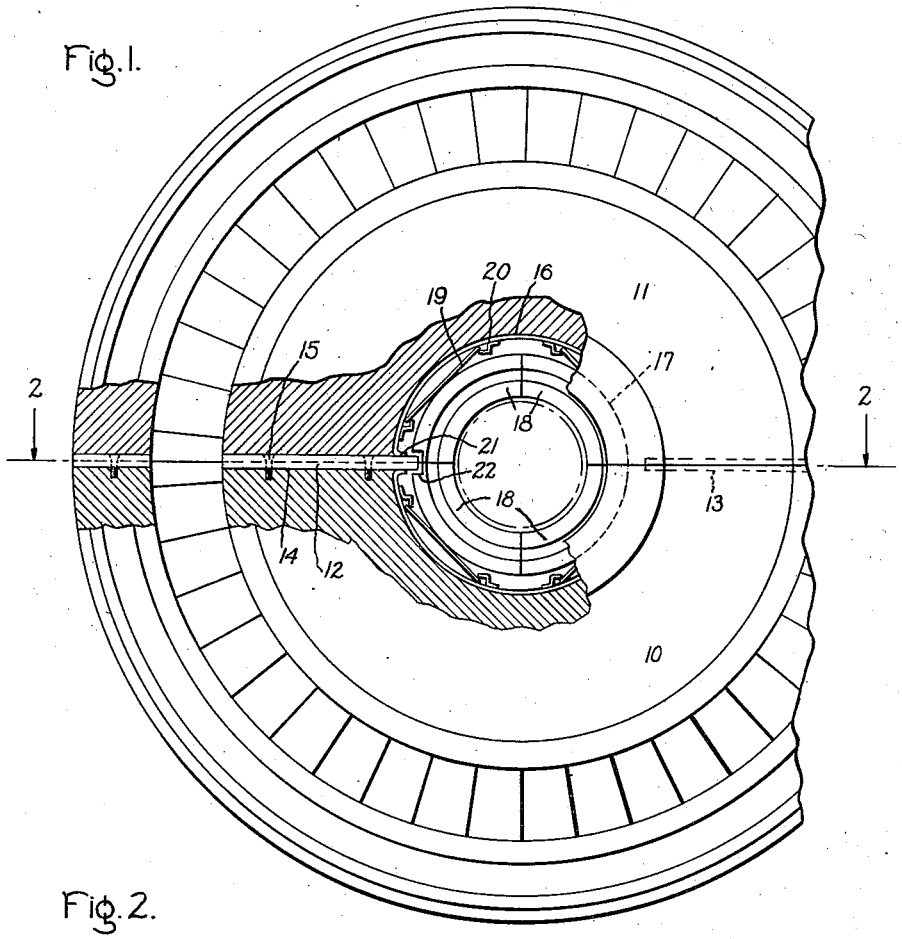
Figure 2:
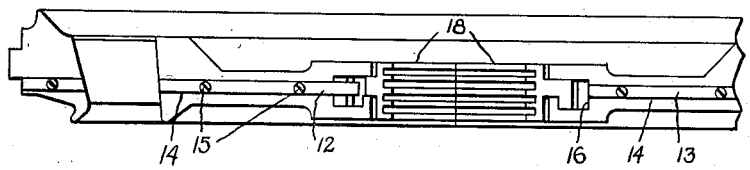
Figure 3:
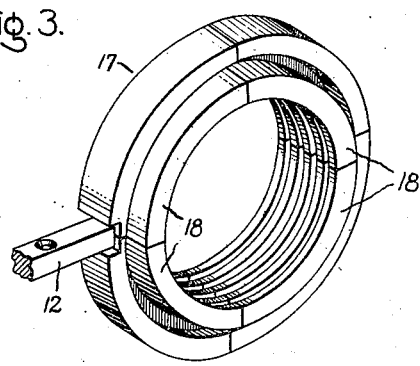

In the drawing Fig. 1 illustrates an arrangement according to my invention; Fig. 2 is a view along line 2—2 of Fig. 1; and Fig. 3 is a perspective view of certain parts of Fig. 1.

The arrangement comprises a diaphragm with a lower half 10 and an upper half 11 engaging each other along a horizontal plane through the center and held in relative position to each other by means of two keys 12 and 13 securely held in grooves 14 in the lower diaphragm half by means of screws 15 and projecting into grooves in the upper diaphragm half. The central portion of the diaphragm disk forms a large opening 16 for receiving a device 17 to seal the diaphragm to a turbine shaft, not shown. The purpose of such seal, as is well known, is to reduce leakage of elastic fluid along such shaft between succeeding turbine stages. The sealing device shown in the drawing is of known construction. It comprises a plurality, in the present instance 4 segmental sealing members 18 which together form a sealing ring and are held in archbound engagement in sealing contact with a shaft by flat springs 19 held in position on retainer strips 20. There is one strip 20 for each diaphragm half and the two strips together form in substance a retainer ring. Each strip has end portions 21 which are bent radially inward. A sealing device of this type is more fully described in the patent to E. M. Phillips, No. 1,855,890, assigned to the same assignee as the present application. Two segments 18 of the sealing ring near the horizontal plane through the diaphragm center have cutoff outer edge portions to form a groove 22. The key 12 according to my invention projects into the groove 22 of the sealing ring and the inward projection also engages the inward bent end portions 21 of the retainer ring. In this manner the key 12 serves both to maintain the relative position of the two diaphragm halves and also to maintain the relative position between the diaphragm and the sealing device.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is:

Turbine diaphragm arrangement including the combination of a diaphragm having two halves with recesses registering with each other and a key secured in one recess and projecting into the other to maintain the two halves in their relative position, the diaphragm forming a central bore, a sealing device located in the bore and engaging the diaphragm to seal the diaphragm to a shaft, said device comprising a sealing ring with a groove in its outer surface near the joint of the diaphragm and two metal strips engaging the wall of the bore and having bent end portions near the joint of the diaphragm, and means comprising an extension of said key engaging the bent end portions and projecting into the groove to limit movement of the sealing device relative to the diaphragm.

GEORGE A. SPENCER.